(12) United States Patent
Kuroe et al.

(10) Patent No.: US 7,641,225 B2
(45) Date of Patent: Jan. 5, 2010

(54) MOTORCYCLE AIRBAG MODULE

(75) Inventors: Takeshi Kuroe, Saitama (JP); Takashi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 12/046,924

(22) Filed: Mar. 12, 2008

(65) Prior Publication Data

US 2008/0224456 A1 Sep. 18, 2008

(30) Foreign Application Priority Data

Mar. 15, 2007 (JP) .............................. 2007-067104

(51) Int. Cl.
*B60R 21/231* (2006.01)
(52) U.S. Cl. ................. 280/730.1; 280/743.1
(58) Field of Classification Search .............. 280/728.1, 280/730.1, 743.1, 743.2
See application file for complete search history.

(56) References Cited

U.S. PATENT DOCUMENTS

| | | | | |
|---|---|---|---|---|
| 5,938,231 | A * | 8/1999 | Yamazaki | 280/730.1 |
| 7,044,499 | B2 * | 5/2006 | Miyata et al. | 280/730.1 |
| 7,152,875 | B2 * | 12/2006 | Kai | 280/739 |
| 7,275,762 | B2 * | 10/2007 | Miyata | 280/743.2 |
| 2003/0214121 | A1 * | 11/2003 | Miyata et al. | 280/730.1 |
| 2004/0256848 | A1 * | 12/2004 | Miyata et al. | 280/743.2 |
| 2007/0052216 | A1 * | 3/2007 | Miyata | 280/730.1 |

FOREIGN PATENT DOCUMENTS

JP          2005-153613 A      6/2005

* cited by examiner

*Primary Examiner*—Paul N. Dickson
*Assistant Examiner*—Timothy Wilhelm
(74) *Attorney, Agent, or Firm*—Westerman, Hattori, Daniels & Adrian, LLP

(57) ABSTRACT

A motorcycle airbag module includes an inflatable airbag, which is deployed between the rider's seat and the steering handlebar of a motorcycle. First and second recessed portions are formed in the front face of the airbag, when in an inflated and deployed state. The first recessed portion extends in a longitudinal direction in the center part of the front face and the second recessed portion diverges and extends respectively to the right and left from the lower end of the first recessed portion arranged in the longitudinal direction. The front face of the airbag is sectioned by the first and second recessed portions to form right and left inflated portions as well as a lower inflated portion. The right and left inflated portions are positioned respectively on the right and left sides of the first recessed portion, and the lower inflated portion is positioned below the second recessed portions.

5 Claims, 7 Drawing Sheets

MOTORCYCLE AIRBAG MODULE

FIELD OF INVENTION

The present invention relates to a motorcycle airbag module, and particularly to a motorcycle airbag module having improved rider restraint performance.

BACKGROUND OF THE INVENTION

Recently, motorcycles equipped with an airbag module have been developed. Upon detection of a collision, the airbag module inflates and deploys an airbag to mitigate the impact that the rider receives. A motorcycle that is equipped with an airbag module is disclosed in, for example, Japanese Patent Application Laid-open Publication No. 2005-153613. FIG. 7 is a front view (a view seen from the rider's side) of an air bag that is inflated and deployed in front of the rider, in a conventional airbag module. The shape of the front face (the shape seen from the rider's side) of the conventional airbag is designed to have an inverted triangular shape with the upper part overall wider than the lower part. In addition, a recess 101 extending in a longitudinal direction is formed in the front face of an airbag 100. Hence, the front face of the airbag 100 forms a cross section having a v-shape, the center of which is recessed while the right and left sides protrude. Accordingly, when the rider of the motorcycle is pressed against the deployed airbag 100, this v-shape effectively prevents lateral movement of the rider, thereby making it easier to catch the rider at a center part of the front face of the airbag 100. Note that, one end portion of each of two straps 102 and 103 for keeping the airbag 100 in a predetermined shape is joined to the center of the front face of the airbag 100. The other end portions of the respective straps 102 and 103 are joined to the frame body of the motorcycle.

SUMMARY OF THE INVENTION

With the airbag shown in FIG. 7, the v-shape makes it easier to catch the rider by preventing the rider from moving to the right or left side of the vehicle body. However, the v-shape of the airbag may, in some cases, not be able to sufficiently absorb the force with which the rider moves upward. In view of this, it is desired that an airbag be provided with a function of absorbing the force which further moves the rider upward from where the rider positions after colliding with the front face of the airbag.

Thus, one object of the present invention is to provide a motorcycle airbag module that can enhance the rider restraint performance of an airbag by preventing the rider caught by the inflated and deployed airbag from moving to the right or left side, or upward, in relation to the airbag.

To achieve the above object, one aspect of the present invention provides a motorcycle airbag module including an airbag which is to be inflated and deployed between the rider's seat and the steering handlebar of a motorcycle. In the airbag module, first and second recessed portions are formed in the front face of the airbag in an inflated and deployed state. The first recessed portion extends in a longitudinal direction in the center part of the front face. The second recessed portion diverges and extends respectively to the right and left from the lower end of the first recessed portion arranged in the longitudinal direction. The front face of the airbag is sectioned by the first and second recessed portions to form right and left inflated portions as well as a lower inflated portion. The right and left inflated portions are positioned respectively to the right and left of the first recessed portion. The lower inflated portion is positioned below the second recessed portion.

Hence, the head of the rider caught by the airbag is restrained from the right and left sides by the right and left inflated portions, and thereby lateral movements of the head are more effectively prevented. Moreover, the shoulders of the rider are restrained by the right and left inflated portions and the lower inflated portion, and thereby upward movements of the rider are prevented. Accordingly, the airbag effectively prevents the rider from moving to the right or left side of the airbag as well as from moving upward, and consequently catches the rider by effectively using the entire front face of the airbag. Hence, excellent impact absorption is promising.

According to another aspect of the present invention shoulder portions protruding toward the rider's seat are formed respectively in the lower regions of the right and left inflated portions on the front face of the airbag.

Hence, since the right and left inflated portions can be formed much higher relative to the second recessed portions by means of the shoulder portions, the shoulders of the rider are more easily caught by the shoulder portions of the airbag. Accordingly, the rider can be more effectively prevented from moving upward along the front face of the airbag.

According to another aspect of the present invention, the ends of straps for restraining the airbag are joined respectively to the right and left inflated portions on the front face of the airbag, the straps connecting the airbag and the frame body of the motorcycle.

In a motorcycle airbag module, an airbag is inflated and deployed when the motorcycle receives an impact from the front. Such a motorcycle airbag module generally provides, on the front face of the airbag, a cushion face capable of catching the rider of the motorcycle.

Hence, the airbag is thus deformed so that the first recessed portion can be deep. Accordingly, the effects of preventing the head of the rider from moving to the right or left side from the center of the airbag can be made even greater.

BRIEF DESCRIPTION OF THE DRAWINGS

A preferred embodiment of the present invention will be described with reference to the accompanying drawings, wherein.

DETAILED DESCRIPTION OF THE INVENTION

Hereinafter, a description will be given of an embodiment of the present invention with reference to the drawings.

Figure 1:
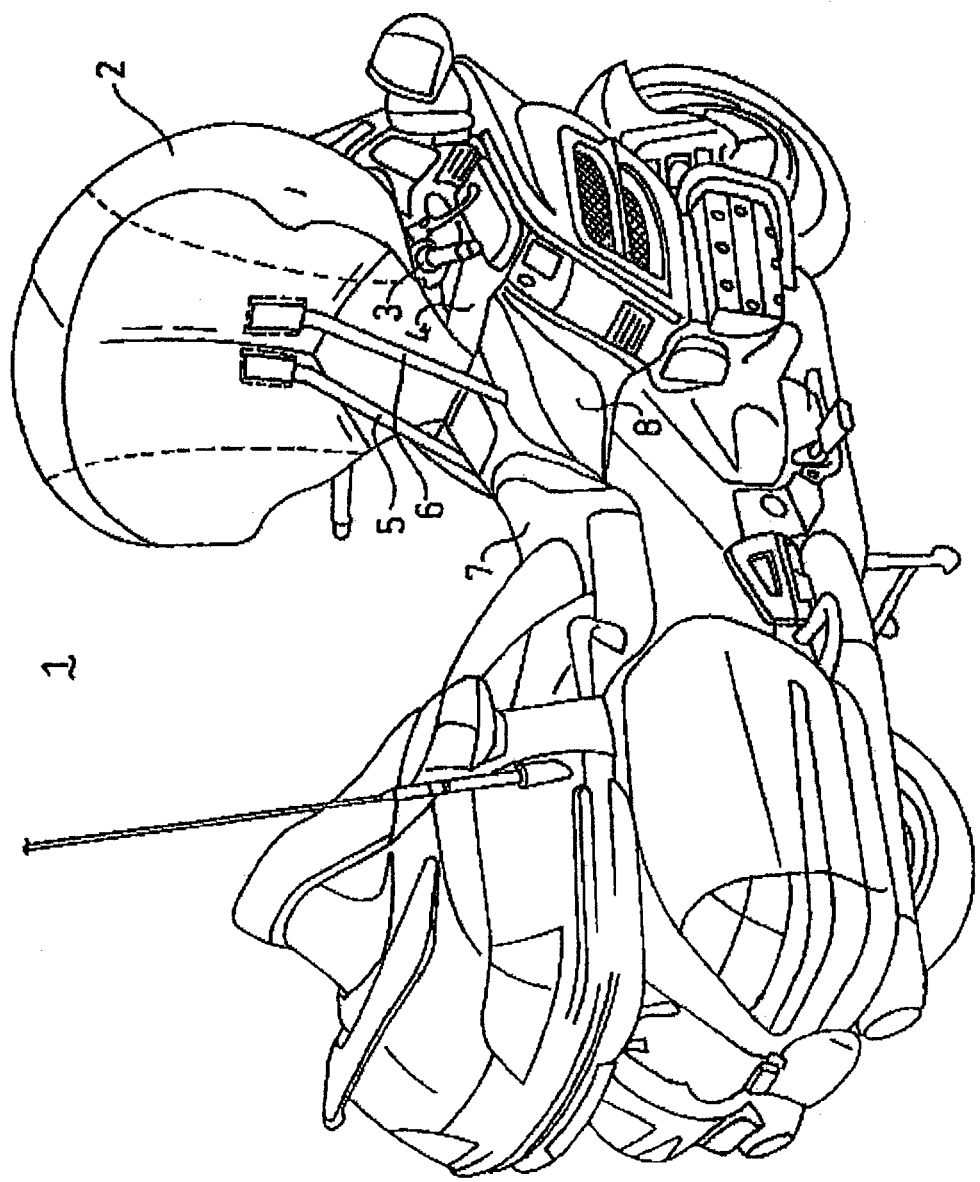
FIG. 1 is a perspective view of a motorcycle that is provided with an airbag module according to an embodiment of the present invention.

FIG. 1 is a perspective view of a motorcycle on which a motorcycle airbag module according to one embodiment of the present invention is mounted, and shows the state in which an airbag is inflated and deployed. In the drawing, the airbag module including an airbag 2 and an unillustrated inflator is stored in a front panel 4 located near a steering handlebar 3. When an impact with a value not less than a predetermined value is detected by an impact detection sensor (for example, an acceleration sensor) provided to a motorcycle 1, the inflator is ignited to introduce gas into the airbag 2, thereby inflating the airbag 2. The inflated airbag 2 breaks a fragile portion of the front panel 4 to be deployed as shown in the drawing. The airbag 2 is connected to the motorcycle 1 by two straps 5 and 6. Each of the straps 5 and 6 is joined, at the upper end portion thereof, to the front face (the face facing the rider) of the airbag 2, and is also joined, at the lower end portion thereof, to the frame body (not illustrated) of the motorcycle 1. The straps 5 and 6 are folded and stored in a space formed above a fuel tank 8, which is disposed in front of a rider's seat 7. The straps 5 and 6 extend along with the deployment of the airbag 2 upon detection of an impact to restrain the position of the airbag 2 so that the airbag 2 does not move to the front side of the motorcycle 1, by extending along with the deployment of the airbag 2 at the time of impact detection.

Figure 2:
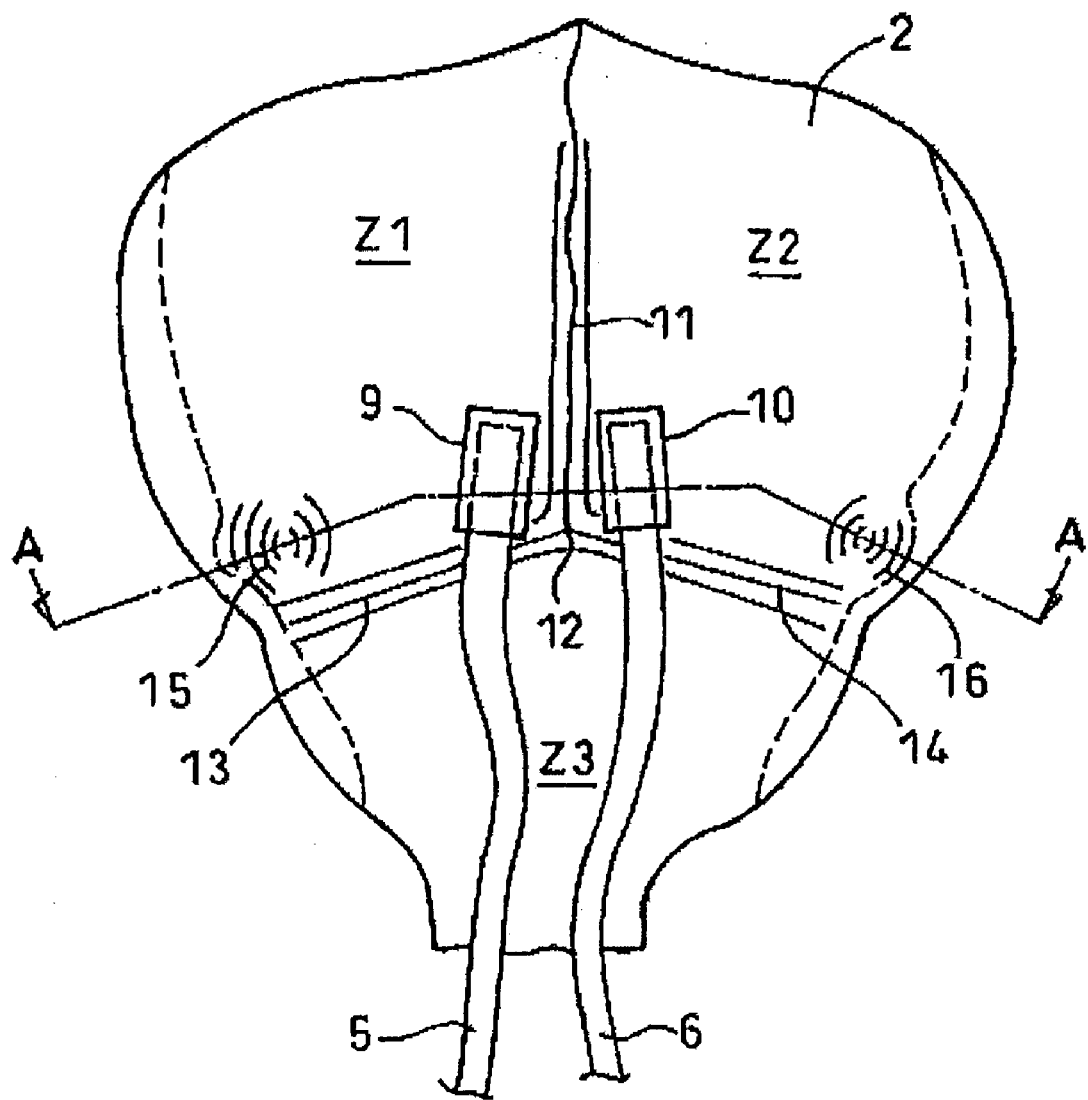
FIG. 2 is a front view showing a deployed airbag of the airbag module according to the embodiment of the present invention.
Figure 3:
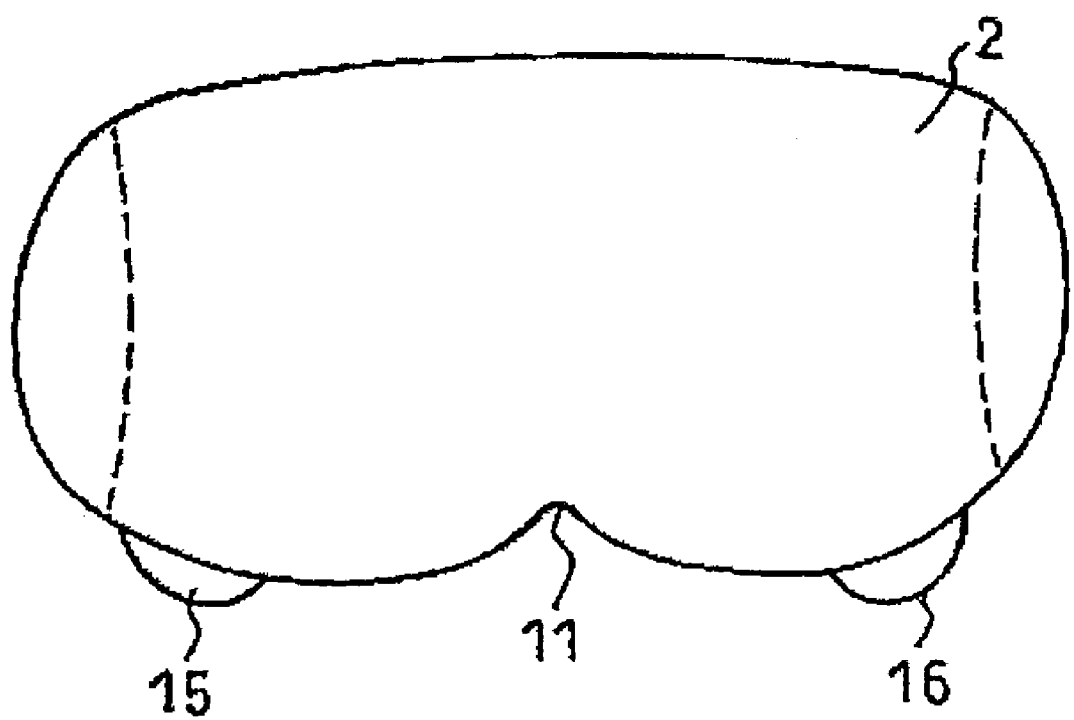
FIG. 3 is a top view of the deployed airbag.
Figure 4:
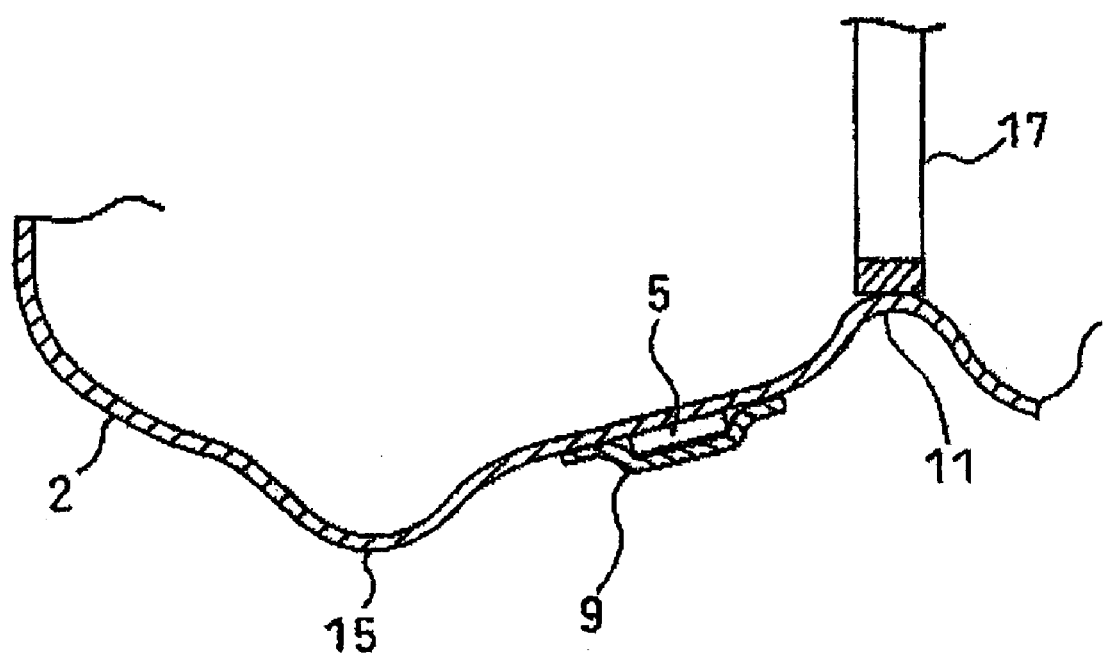
FIG. 4 is a cross-sectional view taken along the line A-A in FIG. 2.

FIG. 2 and FIG. 3 are respectively a front view and a top view of the airbag 2, and FIG. 4 is a cross-sectional view taken along line A-A in FIG. 2. In the drawings, the straps 5 and 6 are joined to the airbag 2 by using patches 9 and 10, which are, for example, made of the same fabric as that of the airbag 2. The airbag 2 is formed to have a recessed portion, that is, a V-shaped longitudinal groove (first recessed portion) 11 extending from the upper side to the lower side when the airbag 2 is in an inflated and deployed state. This longitudinal groove 11 extends substantially to a lower end position 12 of the patches 9 and 10, and is branched at the lower end position 12 to the right and left, to form lateral grooves (second recessed portions) 13 and 14, which extend substantially to the right and left end parts of the airbag 2, respectively. Although the lateral grooves 13 and 14 are formed so as to be highest in the center part of the airbag 2 and to become slightly lower as extending respectively toward the right and left end parts of the airbag 2 in this embodiment, the lateral grooves may alternatively be horizontally formed.

With the longitudinal groove 11 as well as the lateral grooves 13 and 14 taken as valleys, three inflated portions Z1, Z2, and Z3 are formed around these valleys in the front face of the airbag 2.

Shoulder portions 15 and 16 are provided respectively on the left side of the patch 9 and the right side of the patch 10, that is, the shoulder portions 15 and 16 are provided respectively at the lower ends of the left and right inflated portions Z1 and Z2. The shoulder portions 15 and 16 protrude toward the rider's seat. Thus, the lateral grooves 13 and 14 are made even deeper by the shoulder portions 15 and 16. As a result, when seen from the front, the front face of the airbag 2, which is the face facing the rider, has a recess in an inverted T-shape or an inverted Y-shape formed of the longitudinal groove 11 and the lateral grooves 13 and 14. In particular, the recess is relatively large in the right and left ends of the airbag 2 due to the shoulder portions 15 and 16.

As to the formation of the longitudinal groove 11 of the airbag 2, it is preferable that a shaping member (e.g., strap or string) 17 for constraining the fabric of the airbag 2 be provided inside the airbag 2 as shown in FIG. 4, in order to prevent the airbag 2 from being inflated outward partially at the position where the longitudinal groove 11 is formed. One end of the shaping member 17 is joined to an inner face of the airbag 2 at the position where the longitudinal groove 11 is to be formed, while the other end of the shaping member 17 is joined to the back face of the airbag 2, that is, the inner face on the front side of the vehicle body. To form the longitudinal groove 11 in a desired shape, it is preferable that the shaping member 17 be provided to a plurality of spots along the position where the longitudinal groove 11 is to be formed. The lateral grooves 13 and 14 can be similarly formed as the longitudinal groove 11.

Next, a description will be given of effects that can be obtained in the case where the rider is caught by the airbag 2 having the above-described shape.

Figure 5:
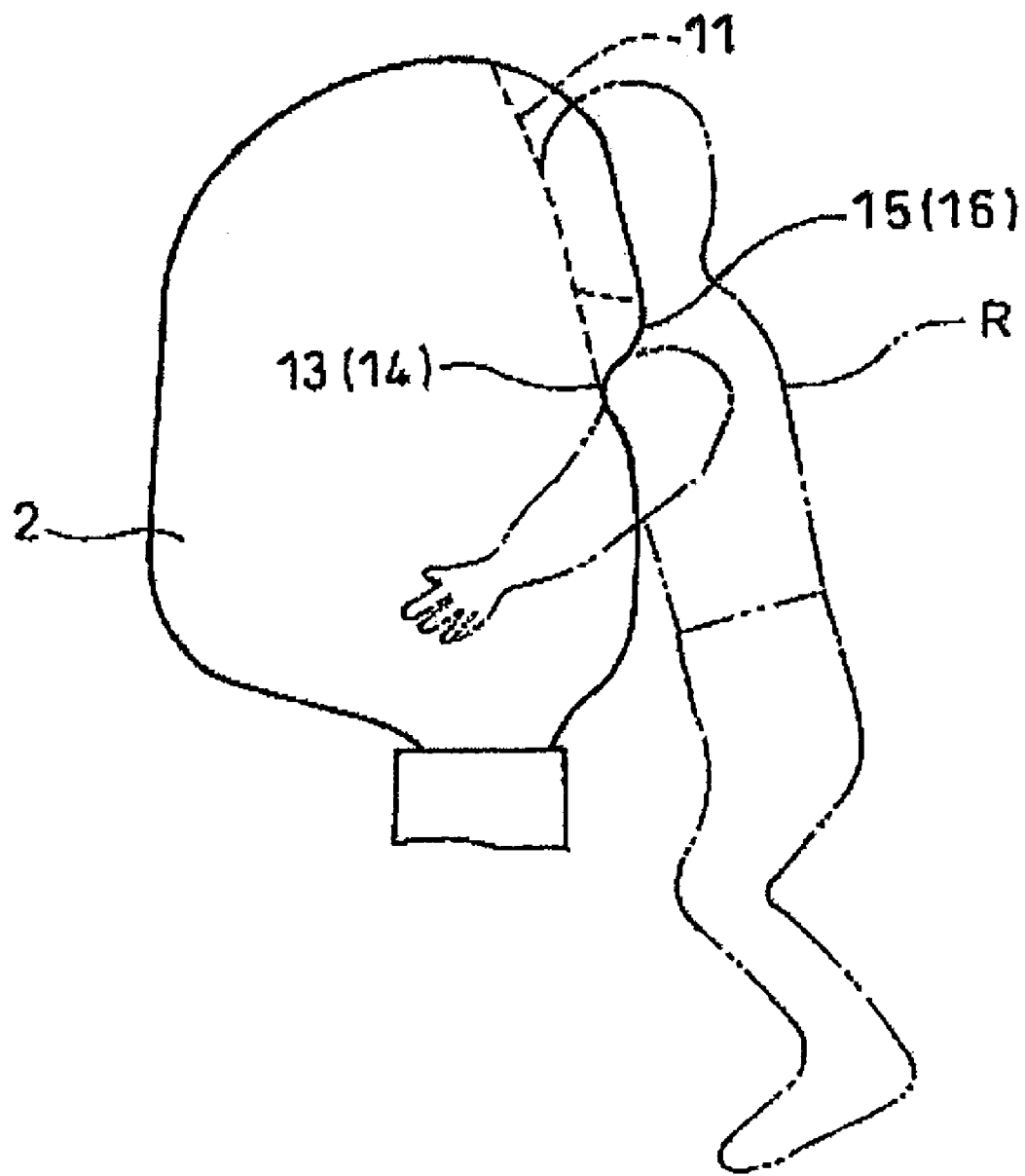
FIG. 5 is a schematic side view of the airbag for illustrating effects of the airbag.
Figure 6:
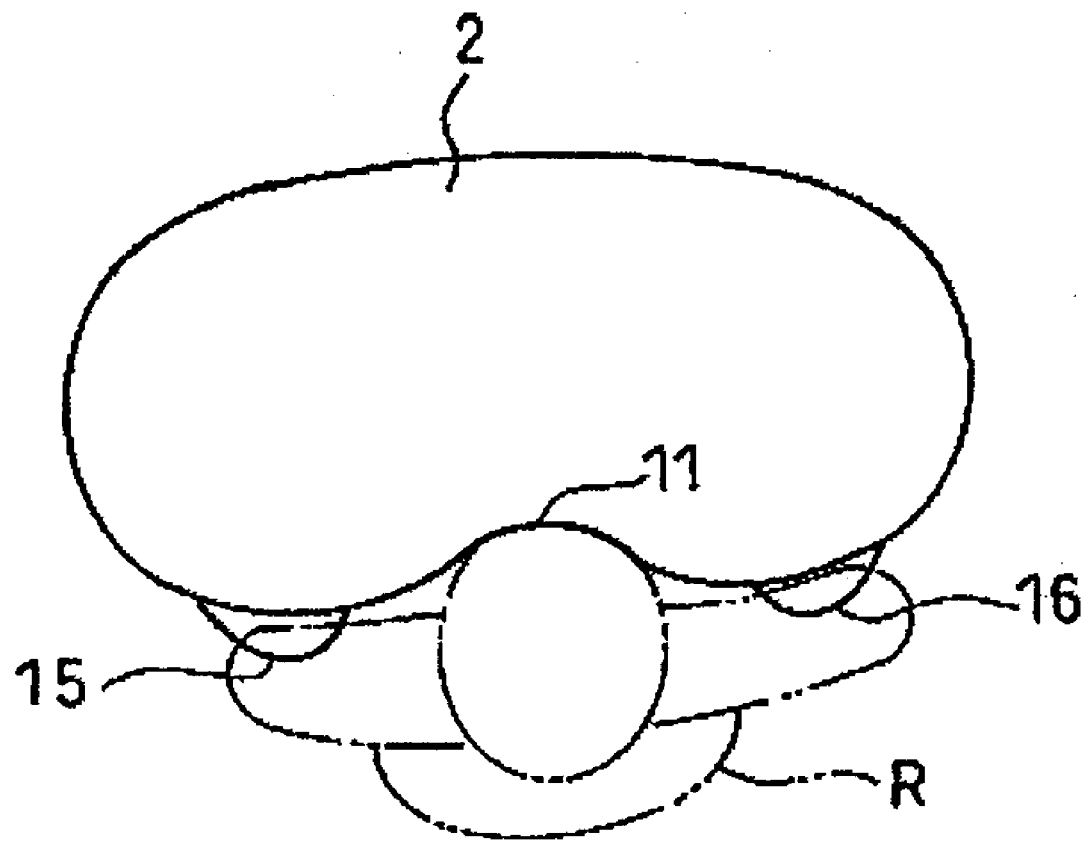
FIG. 6 is a schematic top view of the airbag for illustrating the effects of the airbag.
Figure 7:
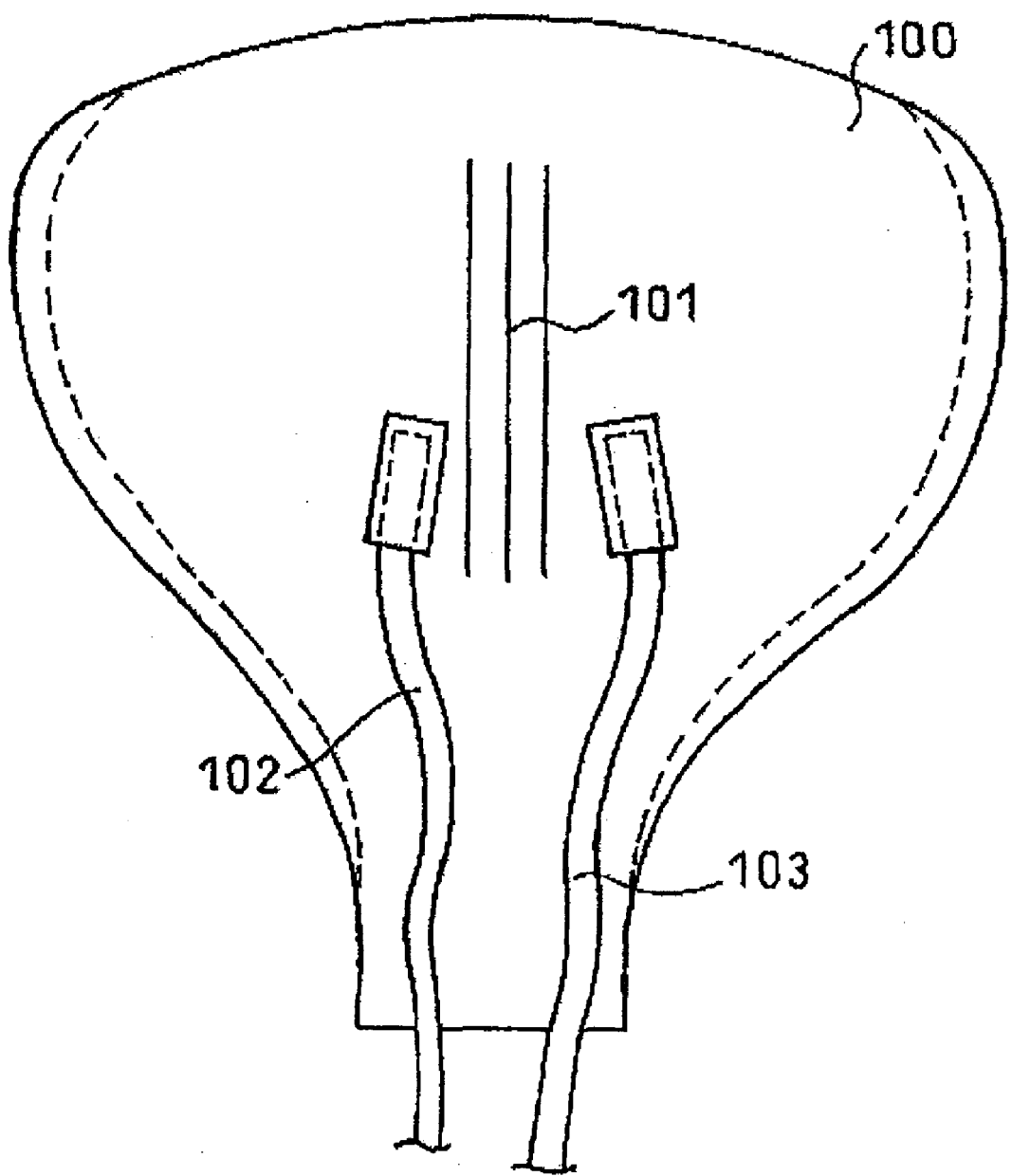
FIG. 7 is a front view of an airbag according to a conventional technique.

FIGS. 5 and 6 are schematic views showing a positional relation between the airbag 2 and the rider. FIG. 5 is a view seen from the left side of the airbag 2. FIG. 6 is a top view. As shown in the drawings, when a rider R is moved forward (to the left in FIG. 5) by an external force applied to the rider R seated on the rider's seat 7, the airbag 2 catches the rider R. In this event, the rider R is led to the center part, in the lateral directions, of the airbag 2 by the longitudinal groove 11 formed in the airbag 2. The rider R is thus prevented from moving to the right or left side. At the same time, the rider R is also prevented from moving upward, by the lateral grooves 13 and 14. In particular, since the shoulder portions 15 and 16 of the airbag 2 catch the shoulders of the rider R, it is possible to more securely prevent the rider R from moving upward.

With this airbag module, the rider is effectively prevented from moving upward along the airbag 2, and hence, it is possible to increase the possibility of catching the rider by the entire front face of the airbag 2.

Although the above embodiments of the present invention have been described in detail, it will be understood that the present invention is not limited to the above-described embodiments, and various modifications in design may be made without departing from the spirit and scope of the invention defined in the claims.

We claim:

1. A motorcycle airbag module comprising an inflatable airbag deployed between a rider's seat and a steering handlebar of a motorcycle, said airbag comprising:

a first recessed portion extending in a longitudinal direction and formed in a center part of a rear face of the airbag in an inflated and deployed state; and a second recessed portion diverging and extending respectively to a right and left direction from a lower end of the first recessed portion arranged in a longitudinal direction and formed in the rear face of the airbag in an inflated and deployed state, wherein the rear face of the airbag is sectioned by the first and second recessed portions to form a right inflated portion, a left inflated portion, and a lower inflated portion, wherein the right inflated portion and the left inflated portion are positioned respectively on a right side and a left side of the first recessed portion, and wherein the lower inflated portion is positioned below the second recessed portion.

2. The motorcycle airbag module according to claim 1, said airbag further comprising:

shoulder portions protruding toward the rider's seat, wherein the shoulder portions are formed respectively in lower regions of the right and left inflated portions on the rear face of the airbag.

3. The motorcycle airbag module according to claim 1, further comprising:

a left air bag restraining strap; and a right air bag restraining strap, wherein an upper end portion of the left strap is attached to the left inflated portion on the rear face of the airbag and a lower end portion of the left strap is attached to the frame body of the motorcycle, and wherein an upper end portion of the right strap is attached to the right inflated portion on the rear face of the airbag and a lower end portion of the right strap is attached to the frame body of the motorcycle.

4. The motorcycle airbag module according to claim 2, further comprising:

a left air bag restraining strap; and a right air bag restraining strap, wherein an upper end portion of the left strap is attached to the left inflated portion on the rear face of the airbag and a lower end portion of the left strap is attached to the frame body of the motorcycle, and wherein an upper end portion of the right strap is attached to the right inflated portion on the rear face of the airbag and a lower end portion of the right strap is attached to the frame body of the motorcycle.

5. A motorcycle airbag module comprising an inflatable airbag deployed between a rider's seat and a steering handlebar of a motorcycle, said airbag comprising:

a first recessed portion extending in a longitudinal direction and formed in a center part of a rear face of the airbag in an inflated and deployed state;

a second recessed portion diverging and extending respectively to a right and left direction from a lower end of the first recessed portion arranged in a longitudinal direction and formed in the rear face of the airbag in an inflated and deployed state; and shoulder portions protruding toward the rider's seat, wherein the rear face of the airbag is sectioned by the first and second recessed portions to form a right inflated portion, a left inflated portion, and a lower inflated portion, wherein the right inflated portion and the left inflated portion are positioned respectively on a right side and a left side of the first recessed portion, wherein the lower inflated portion is positioned below the second recessed portion, and wherein the shoulder portions are formed respectively in lower regions of the right and left inflated portions on the rear face of the airbag.

* * * * *